(12) United States Patent
Chowdhury

(10) Patent No.: US 7,795,596 B2
(45) Date of Patent: Sep. 14, 2010

(54) CLOAKING DEVICE DETECTION SYSTEM

(75) Inventor: Aref Chowdhury, Berkeley Heights, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 39 days.

(21) Appl. No.: 12/006,529

(22) Filed: Jan. 3, 2008

(65) Prior Publication Data

US 2009/0173886 A1    Jul. 9, 2009

(51) Int. Cl.
*G01J 1/42* (2006.01)
(52) U.S. Cl. ..................................... 250/393
(58) Field of Classification Search ................ 250/393
See application file for complete search history.

(56) References Cited

U.S. PATENT DOCUMENTS

| | | | | |
|---|---|---|---|---|
| 6,208,886 | B1 * | 3/2001 | Alfano et al. | 600/473 |
| 6,914,552 | B1 * | 7/2005 | McEwan | 342/22 |
| 7,015,865 | B2 | 3/2006 | Isaacs et al. | 343/757 |
| 2007/0232738 | A1 * | 10/2007 | Bratkovski et al. | 524/439 |
| 2007/0263278 | A1 | 11/2007 | Chowdhury | 359/332 |

FOREIGN PATENT DOCUMENTS

WO    WO 2007134410 A1 *    11/2007

OTHER PUBLICATIONS

Fontana et al., "Recent system applications of short-pulse ultra-wideband technology," 2004, IEEE Transaction on microwave theory and techniques, vol. 52, No. 9, pp. 2087-2104.*

Ran et al, "Experimental study on several left-handed metamaterials," 2005, Progress in Electromagnetics Research, PIER 51, pp. 249-279.*

"Technical Note TN 1000, What is a Lock-in Amplifier," Perkin-Elmer, 4 pp.

Alu et al., "Plasmonic materials in transparency and cloaking problems: mechanism, robustness, and physical insights," Optics Express, vol. 15 No. 6, pp. 3318-3332.

Klein et al., "Experiments on second- and third-harmonic generation from magnetic metamaterials," Optics Express, vol. 15 No. 8, pp. 5238-5247.

Soukoulis et al., "Negative Refractive Index at Optical Wavelengths," Science, vol. 315, pp. 47-49, plus 2pp. corrections.

(Continued)

*Primary Examiner*—David P Porta
*Assistant Examiner*—Kiho Kim
(74) *Attorney, Agent, or Firm*—The Law Office of Jay M. Brown

(57) ABSTRACT

System including electromagnetic radiation source and electromagnetic radiation detector. Electromagnetic radiation source is configured to excite, with electromagnetic radiation having first source frequency, object configured for suppressing responsive emission of electromagnetic radiation having first source frequency. Electromagnetic radiation detector is configured to receive responsive emission of electromagnetic radiation from object. System is configured to detect presence of object. Method includes exciting, with electromagnetic radiation having first source frequency, object configured for suppressing responsive emission of electromagnetic radiation having first source frequency. Method includes receiving responsive emission of electromagnetic radiation from object and utilizing responsive emission to detect presence of object.

22 Claims, 3 Drawing Sheets

OTHER PUBLICATIONS

Khoo et al., "Nano-Dispersed Liquid Crystal with Tunable Negative-Zero-Positive Refractive Indices," Optics & Photonics News, p. 33.
Catrysse, et al., "Metallic Metamaterials with a High Index of Refraction," Optics & Photonics News, p. 34.
Smith et al., "Metamaterials and Negative Refractive Index," Science, vol. 305, pp. 788-792.
"Light Fantastic: Flirting With Invisibility", The New York Times, 3 pp. plus multimedia 2 pp.
Roger Highfield, "Harry Potter invisibility cloak 'within five years'," Telegraph Group Limited, www.telegraph.co.uk, 1 p.
Alu et al., "Cloaking and transparency for collections of particles with metamaterial and plasmonic covers," Optics Express, vol. 15, No. 12, pp. 7578-7590.
Graham-Rowe, "Cloaking Breakthrough,"MIT Technology Review, www.technologyreview.com, 4 pp.
Shadrivov et al., "Second-Harmonic generation in nonlinear left-handed metamaterials," J. Opt. Soc. Am., vol. 23, No. 3, pp. 529-534.
Klein et al., "Second-Harmonic Generation from Magnetic Metamaterials," Science, vol. 313, pp. 502-504.
Lapine et al., "Nonlinearity of a metamaterial arising from diode insertions into resonant conductive elements," Physical Review, vol. E 67, pp. 065601-1 through 065601-4.
Zharov et al., "Nonlinear Properties of Left-Handed Metamaterials," Physical Review Letters, vol. 91, No. 3, pp. 037401-1 through 037401-4.
Chowdhury et al., "Nonlinear wave mixing and susceptibility properties of negative refractive index materials," Physical Review, vol. E 75, pp. 016603-1 through 016603-5.
Cho, "Voila! Cloak of Invisibility Unveiled," Science, vol. 314, p. 403.
Boyle, "Here's how to make an invisibility cloak," www.msnbc.com, 3 p.
"First demonstration of a working invisibility cloak," (first article version), downloaded from http://www.physorg.com/print80488753.html, 3 pp.
"Metamaterial", downloaded from http://en.wikipedia.org/wiki/Metamaterial, 6 pp.
"Plasmon," downloaded from http://en.wikipedia.org/wiki/Plasmon, 4 pp.
"Group Velocity,", downloaded from http://en.wikipedia.org/wiki/Group Velocity, 4 pp.
"First Demonstration of a Working Invisibility Cloak," (second article version), downloaded from http://www.dukenews.duke.edu/2006/10/cloakdemo.html, 4 pp.
"Invisibility cloak is latest amazing 'metamaterial'," Chemistry World, Royal Society of Chemistry, 3 pp.
U.S. Appl. No. 11/942,776, filed Nov. 20, 2007, Chowdhury.

* cited by examiner

CLOAKING DEVICE DETECTION SYSTEM

This invention was made with Government support under Contract No. FA9550-06-1-0547 awarded by the Air Force Office of Scientific Research (AFOSR). The Government has certain rights in the invention.

BACKGROUND OF THE INVENTION

1. Field of the Invention

This invention generally relates to object detection and location systems and methods, utilizing electromagnetic radiation.

2. Related Art

Various types of object detection and location systems and methods, utilizing electromagnetic radiation, have been developed. Radar systems utilizing microwaves, and night-vision systems utilizing infrared light, are examples of such object detection and location systems. Innovations in object detection and location systems utilizing electromagnetic radiation have spurred and been accompanied by developments in apparatus, systems and methods for evading the object detection and location systems. Stealth surfaces and structures for minimizing the radar signature of aircraft, ships, spacecraft, other vehicles, other movable and stationary objects, and personnel, are examples of technology intended to make object detection and location systems ineffective. As the march goes on in development of anti—object-detection and location technology, there is a continuing need for new object detection and location systems and methods that are capable of detecting and locating aircraft, ships, spacecraft, other vehicles, other movable and stationary objects, and personnel despite deployment of anti—object-detection and location techniques.

SUMMARY

In an example of an implementation, a system is provided, including an electromagnetic radiation source and an electromagnetic radiation detector. The electromagnetic radiation source is configured to excite, with electromagnetic radiation having a first source frequency, an object configured for suppressing responsive emission from such an object of electromagnetic radiation having the first source frequency. The electromagnetic radiation detector is configured to receive a responsive emission of electromagnetic radiation from such an object. The system is configured to detect a presence of such an object.

In an additional example of an implementation, a method is provided that includes exciting, with electromagnetic radiation having a first source frequency, an object configured for suppressing responsive emission from such an object of electromagnetic radiation having the first source frequency. The method also includes receiving a responsive emission of electromagnetic radiation from such an object. The method further includes utilizing the responsive emission to detect a presence of such an object.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
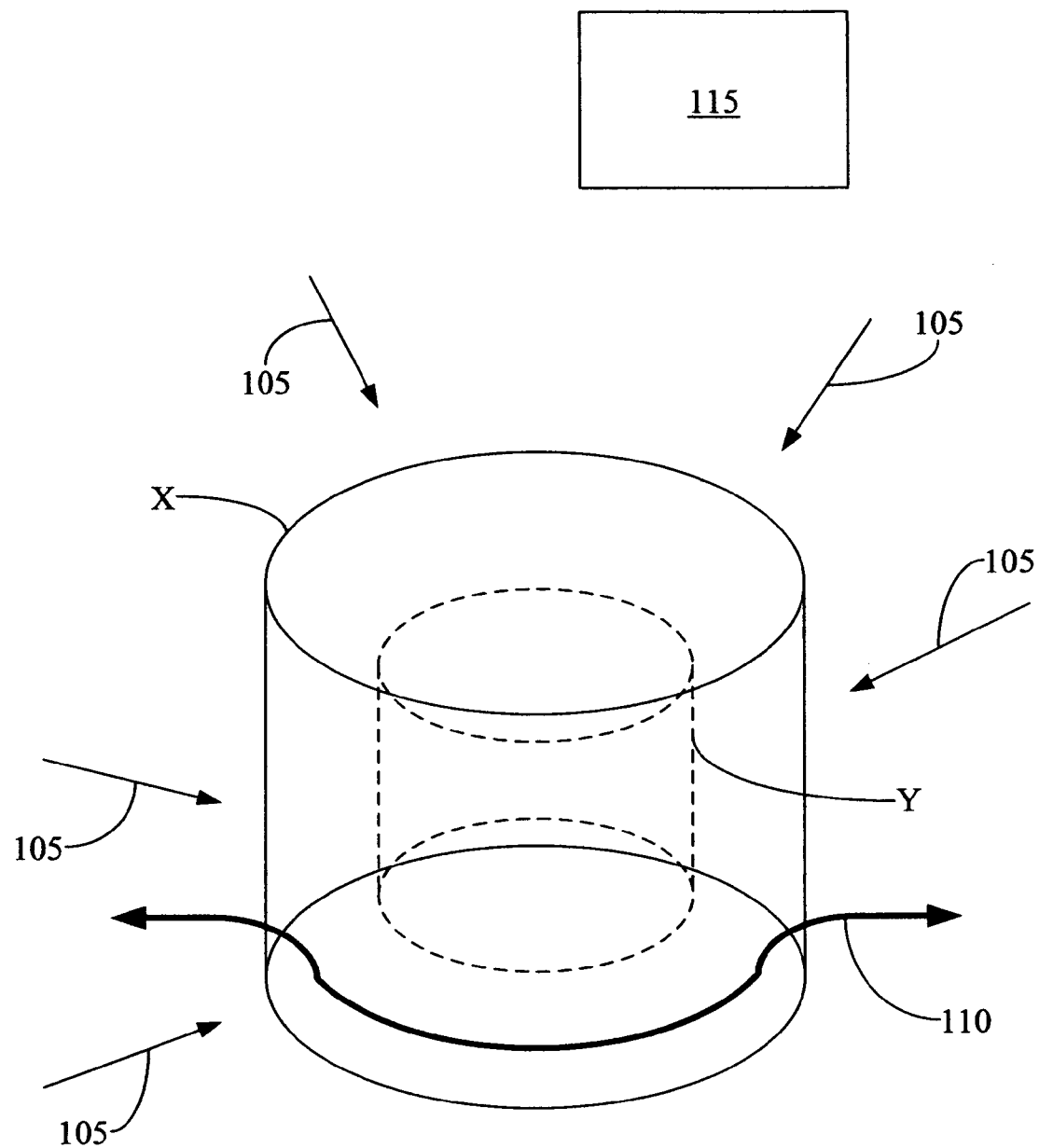
FIG. 1 is a schematic illustration showing an example of an object X configured for suppressing responsive emission from the object X of electromagnetic radiation having a first source frequency.

FIG. 1 is a schematic illustration showing an example of an object X that is configured for suppressing responsive emission from the object X of electromagnetic radiation having a first source frequency. For example, the object X may be a cloaking device suitably positioned for surrounding another object Y. A cloaking device X may be designed, for example, to minimize detectability of or to prevent detection of an object Y such as an aircraft, a ship, a spacecraft, another vehicle, another movable or stationary object, or a person. A cloaking device X may be a structure separate from such an object Y, or the object X may be structurally integrated together with the object Y. For example, the object X may be a surface of the object Y. As another example, a cloaking device X may be designed to minimize or eliminate the radar signature of an object Y such as an aircraft, ship, or spacecraft. A cloaking device X may have an operating electromagnetic radiation frequency range, for example, such that electromagnetic radiation within that frequency range projected from an electromagnetic radiation source to excite the cloaking device X is not responsively emitted by the cloaking device X at a power level sufficiently high for detecting the presence of the object X, or of an object Y that the object X may surround. A cloaking device X that substantially does not emit a detectable power level of microwaves in response to excitation by microwaves projected by an electromagnetic radiation source of a radar system, for example, may be useful for preventing radar detection of an object Y such as an aircraft, ship, or spacecraft. As another example, a cloaking device X covering a person Y and having the visible light frequency spectrum as its operating range might render the person Y nearly or completely invisible to human eyesight.

Electromagnetic radiation having a first source frequency may, for example, excite the object X from various directions as represented by the arrows 105. If the object X is configured for suppressing responsive emission from the object X of electromagnetic radiation having the first source frequency, then electromagnetic radiation having the first source frequency that excites the object X may for example be directionally conveyed around or through the object X as schematically represented by the arrow 110. This directional conveyance of electromagnetic radiation having the first source frequency may, for example, prevent an electromagnetic radiation detector 115 operating at the first source frequency from detecting the object X.

A cloaking device X may include, as an example, a metamaterial. Metamaterials are engineered materials whose physical properties are determined by their man-made physical structures. For example, a metamaterial may include a nano-structured or micro-structured regular two- or three-dimensional lattice of metallic building blocks densely packed into an optically effective material. As another example, a metamaterial may include a polymer blended together with an array of tiny magnetic resonators and an array of wires or diodes that change the paths of electromagnetic radiation in a curved manner. A further example of a metamaterial may include a series of concentric split-ring resonators having U-shaped metal elements of defined dimensions such as millimeter dimensions. Cloaking devices X may be formed of materials, as an additional example, including media having a negative refractive index. A material may have a negative refractive index when the material has both a dielectric constant $\in$, and a magnetic permeability $\mu$, having negative real parts at a particular electromagnetic radiation frequency. The negative refractive index may cause electromagnetic radiation at the particular frequency to be abnormally refracted at interfaces between the metamaterial and media with positive refractive indexes. In abnormal refraction, incident and refracted light rays may both lie on the same side of the normal to the interface between the metamaterial and such media. Further background information on metamaterials is disclosed in Isaacs et al., U.S. Pat. No. 7,015,865, issued on Mar. 21, 2006, entitled "Media with Controllable Refractive Properties"; and Chowdhury et al., Published U.S. Patent Application No. 2007/0263278A1, published on Nov. 15, 2007, entitled "Nonlinear Optical Devices Based on Metamaterials"; the entireties of both of these two documents hereby being incorporated herein by reference.

A cloaking device X may also include composite materials having two or more different types of elements configured for suppressing responsive emission from the cloaking device X of electromagnetic radiation having a first source frequency. Further, a cloaking device X may include a plasmonic material operating near its plasma frequency, having for example a low-positive or negative electric permittivity.

A primary function of a cloaking device X may be to prevent detection of the presence or location of an object Y that is shielded by the cloaking device X. For example, a cloaking device X might be utilized to shield an aircraft Y from detection or location by enemy radar. Effective development of cloaking devices X thus creates a problem for those who may want to override the cloaking efficacy of such cloaking devices X so that the presence and locations of the shielded objects Y can be detected.

Figure 2:
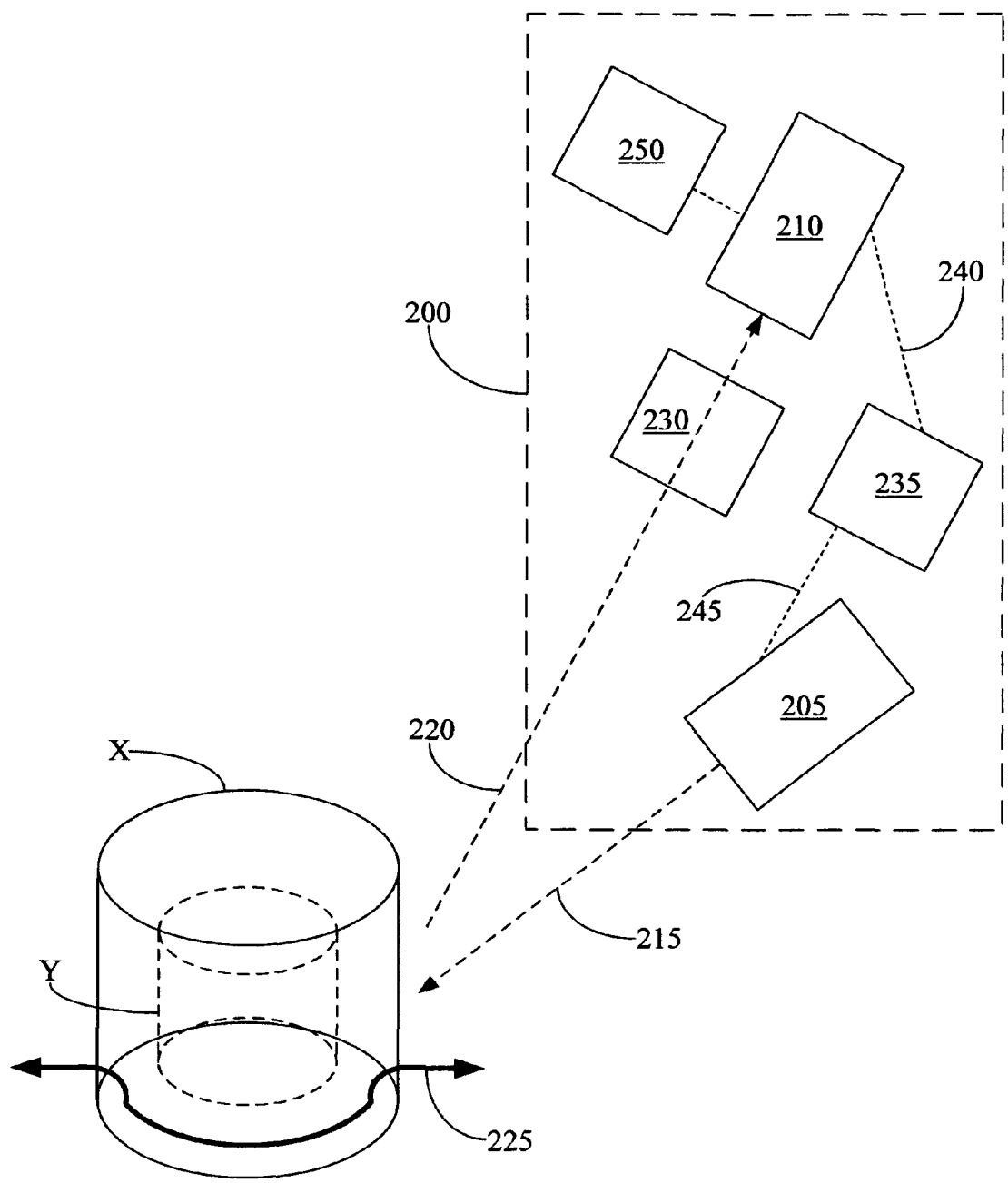
FIG. 2 is a schematic view showing an example of an implementation of a system including an electromagnetic radiation source and an electromagnetic radiation detector.

FIG. 2 is a schematic view showing an example of an implementation of a system 200 including an electromagnetic radiation source 205 and an electromagnetic radiation detector 210. The electromagnetic radiation source 205 is configured to excite, with electromagnetic radiation 215 having a first source frequency $\omega_1$, an object X configured for suppressing responsive emission from such an object X of electromagnetic radiation 220 having the first source frequency $\omega_1$. The electromagnetic radiation detector 210 is configured to receive a responsive emission of electromagnetic radiation 220 from such an object X after the electromagnetic radiation 215 excites the object X. The system 200 is configured to detect a presence of such an object X.

The system 200 may, for example, be configured to determine a direction of a location of such an object X relative to a location of the electromagnetic radiation detector 210. As an example, the system 200 may be configured to determine the location in three-dimensional space of an object X relative to the electromagnetic radiation detector 210. Further, the electromagnetic radiation detector 210 may have a known fixed position, or may include (not shown) a global positioning satellite ("GPS") unit.

The system 200 may, for example, take advantage of a nonlinear electromagnetic susceptibility of an object X. The object X may, as examples, have a second-order nonlinear electromagnetic susceptibility, or a third-order nonlinear electromagnetic susceptibility, or both second- and third-order nonlinear electromagnetic susceptibilities. The object X may have nonlinear electromagnetic susceptibilities within certain electromagnetic radiation frequency ranges. For example, the electromagnetic radiation detector 210 may be configured to receive a responsive emission of electromagnetic radiation 220 having a frequency generated by a nonlinear electromagnetic susceptibility of such an object X. The system 200 may, for example, facilitate detection of the presence or location of the object X both when electromagnetic radiation 215 that is within an electromagnetic radiation frequency range of the object's nonlinear electromagnetic susceptibility excites the object X, as well as when electromagnetic radiation 215 that is outside of any electromagnetic radiation frequency range of the object's nonlinear electromagnetic susceptibility excites the object X.

In an example, the electromagnetic radiation source 205 and the electromagnetic radiation detector 210 may be physically separated from each other. The electromagnetic radiation source 205 may be located in a first movable or stationary object such as a vehicle or building, and the electromagnetic radiation detector 210 may be located in a second movable or stationary object such as a vehicle or building. The electromagnetic radiation source 205 may be suitable for emitting electromagnetic radiation 215 having a fixed or tunable frequency or frequency range. The electromagnetic radiation source 205 may be operable to emit electromagnetic radiation 215 in a continuous mode or a pulsed mode. The electromagnetic radiation source 205 may be configured to control a direction of emission of the electromagnetic radiation 215. For example, the electromagnetic radiation source 205 may include a tunable laser. The electromagnetic radiation 215 may include, as examples, an electromagnetic radiation beam, or a plurality of electromagnetic radiation beams.

The electromagnetic radiation source 205 may, for example, project electromagnetic radiation 215 having a first source frequency $\omega_1$ across a scanned area and happen to excite the object X with electromagnetic radiation 215. The first source frequency $\omega_1$, and any further source frequencies included in the electromagnetic radiation. 215 as discussed below, may be within one or more selected electromagnetic radiation frequency ranges, such as an electromagnetic radiation frequency range including visible or infrared light, or a microwave frequency range. In an example, an object X may be configured for suppressing, when the object X is excited by electromagnetic radiation having the first source frequency $\omega_1$, responsive emissions from the object X of electromagnetic radiation having a frequency or range of frequencies including the first source frequency $\omega_1$. Hence, in that example the object X may not responsively emit electromagnetic radiation 220 having the first source frequency $\omega_1$ in the direction of the electromagnetic radiation detector 210. Instead, electromagnetic radiation 215 having the first source frequency $\omega_1$ may for example be conveyed around or through the object X in the same manner as discussed earlier in connection with FIG. 1, as schematically illustrated by the arrow 225. As a result, the electromagnetic radiation detector 210 may not detect responsive emissions from the object X of electromagnetic radiation 220 having the first source frequency $\omega_1$ at a power level sufficiently high for detection of the object X. However, the system 200 may be configured to take advantage of a nonlinear electromagnetic susceptibility of the object X for detecting a responsive emission of electromagnetic radiation 220 from the object X at another electromagnetic radiation frequency.

In an example, the electromagnetic radiation source 205 may be configured to emit electromagnetic radiation 215 including electromagnetic radiation having a first source frequency $\omega_1$, and the system 200 may be configured to detect, included in the electromagnetic radiation 220, a second or third harmonic of the first source frequency $\omega_1$. A nonlinear electromagnetic susceptibility of an object X may cause the object X to responsively emit second and third harmonics of the first source frequency $\omega_1$ when the object X is excited by electromagnetic radiation 215 having the first source frequency $\omega_1$. The second and third harmonics of the first source frequency $\omega_1$ respectively have frequencies of $2\omega_1$ and $3\omega_1$.

As another example, the system 200 may include a filter 230. The filter 230 may, for example, be configured to attenuate electromagnetic radiation having the first source frequency $\omega_1$. In this manner, the electromagnetic radiation detector 210 may be isolated from stray electromagnetic radiation 215 having the first source frequency $\omega_1$ that may be directed toward the electromagnetic radiation detector 210 from an object other than an object X configured for suppressing responsive emission from the object X of electromagnetic radiation 220 having the first source frequency $\omega_1$. In a further example, the filter 230 may be configured to selectively pass the second or third harmonic, or the second and third harmonics, of the first source frequency $\omega_1$. For example, the filter 230 may include a band pass filter configured to pass either or both of the second and third harmonics of the first source frequency $\omega_1$. The filter 230 may be, for example, an optical filter. The filter 230 may, as further examples, be distant from or near to the electromagnetic radiation source 205.

In another example, the electromagnetic radiation source 205 may be configured to emit electromagnetic radiation 215 including electromagnetic radiation having both the first source frequency $\omega_1$ and a second source frequency $\omega_2$. In that example, the system 200 may be configured to detect electromagnetic radiation included in the electromagnetic radiation 220 having about a frequency that includes a sum or a difference of the first and second source frequencies $\omega_1$ and $\omega_2$, or a multiple of one of the first and second source frequencies $\omega_1$ and $\omega_2$, or a combination of the foregoing. As examples, the system 200 may be configured to detect electromagnetic radiation included in the electromagnetic radiation 220 having about a frequency that includes a sum of the first source frequency $\omega_1$ and the second source frequency $\omega_2$, or a difference between the first source frequency $\omega_1$ and the second source frequency $\omega_2$, or a multiple of one of the first and second source frequencies $\omega_1$ and $\omega_2$, or a combination including one or more of such sums, differences, and multiples. Thus, a nonlinear electromagnetic susceptibility of an object X may cause the object X to responsively emit electromagnetic radiation having about a frequency that includes a sum or a difference of the first and second source frequencies $\omega_1$ and $\omega_2$, or a multiple of one of the first and second source frequencies $\omega_1$ and $\omega_2$, or a combination of the foregoing, when the object X is excited by electromagnetic radiation having the first and second source frequencies $\omega_1$ and $\omega_2$.

A frequency that about includes a sum or a difference of the first and second source frequencies $\omega_1$ and $\omega_2$, or a multiple of one of the first and second source frequencies $\omega_1$ and $\omega_2$, or a combination of the foregoing may, as examples, include one or more of the second and third harmonics of the first and second source frequencies $\omega_1$ and $\omega_2$. The second and third harmonics of the second source frequency $\omega_2$ respectively have frequencies of $2\omega_2$ and $3\omega_2$. Electromagnetic radiation having about a frequency that includes a sum or a difference of the first and second source frequencies $\omega_1$, and $\omega_2$, or a multiple of one of the first and second source frequencies $\omega_1$ and $\omega_2$, or a combination of the foregoing may further, as examples, include electromagnetic radiation having about a frequency that includes single or multiple combinations of one or more: sums or differences of the first source frequency $\omega_1$ and the second source frequency $\omega_2$, or multiples of one of the first and second source frequencies $\omega_1$ and $\omega_2$, or a combination of the foregoing. Examples of these combinations of sums, differences, and multiples of the frequencies $\omega_1$ and $\omega_2$ include: $(\omega_1+\omega_2)$, $(\omega_1-\omega_2)$, $(2\omega_1-\omega_2)$, $(2\omega_1+\omega_2)$, $(2\omega_2-\omega_1)$, and $(\omega_1+2\omega_2)$. It is understood that other single or multiple combinations of one or more: sums or differences of the first source frequency $\omega_1$ and the second source frequency $\omega_2$, or multiples of one of the first and second source frequencies $\omega_1$ and $\omega_2$, or a combination of the foregoing, may be utilized. As further examples, the electromagnetic radiation source 205 may be configured to emit electromagnetic radiation 215 including electromagnetic radiation having three or more frequencies $\omega_1$, $\omega_2$, $\omega_3$, . . . , and the system 200 may be configured to detect electromagnetic radiation having about a frequency that includes a sum or a difference of two or more of the frequencies $\omega_1$ $\omega_2$, $\omega_3$ . . . , or a multiple of one of the frequencies $\omega_1$ $\omega_2$, $\omega_3$ . . . , or a combination of the foregoing, emitted in the electromagnetic radiation 215.

As another example, the system 200 may include a filter 230 configured to attenuate electromagnetic radiation having either of the first and second source frequencies $\omega_1$ and $\omega_2$. In this manner, the electromagnetic radiation detector 210 may be isolated from stray electromagnetic radiation 215 having the first and second source frequencies $\omega_1$ and $\omega_2$, that may for example be directed toward the electromagnetic radiation detector 210 from objects other than an object X configured for suppressing responsive emission from the object X of electromagnetic radiation having the first and second source frequencies $\omega_1$ and $\omega_2$. In further examples, the filter 230 may be configured to selectively pass the second harmonic, or the third harmonic, or both the second and third harmonics, of the first or second source frequencies $\omega_1$ and $\omega_2$. In additional examples, the filter 230 may be configured to selectively pass the second harmonic, or the third harmonic, or both the second and third harmonics, of both of the first and second source frequencies $\omega_1$ and $\omega_2$. As another example, the filter 230 may include a multi-band pass filter. In further examples, the filter 230 may be configured to selectively pass any of the frequencies that about includes a sum or a difference of the first and second source frequencies $\omega_1$ and $\omega_2$, or a multiple of one of the first and second source frequencies $\omega_1$ and $\omega_2$, or a combination of the foregoing.

In any of the preceding examples, the electromagnetic radiation source 205 may be configured either to emit continuous or pulsed electromagnetic radiation 215. In an example, the electromagnetic radiation source 205 may be configured to emit electromagnetic radiation 215 in discrete pulses that may include one or a plurality of frequencies such as first and second source frequencies $\omega_1$ and $\omega_2$. Emission of the electromagnetic radiation 215 in discrete pulses may enable the electromagnetic radiation source 205 to emit electromagnetic radiation with relatively higher peak power than in an alternative case where the electromagnetic radiation source 205 may operate in a continuous mode having a lower, average power. Such higher peak power electromagnetic radiation may more intensely excite the object X, and may have a higher likelihood of causing the object X to responsively emit electromagnetic radiation 220 having sufficiently high power for detection by the electromagnetic radiation detector 210. In another example, the system 200 may include a lock-in amplifier 235 that may aid the electromagnetic radiation detector 210 in differentiating background noise electromagnetic radiation from pulsed light of a known repetition rate emitted from an object X in response to excitation of the object X by pulsed electromagnetic radiation 215. The lock-in amplifier 235 may be in communication with the electromagnetic radiation detector 210 as represented by the dotted line 240, and may be in communication with the electromagnetic radiation source 205 as represented by the dotted line 245. The lock-in amplifier 235 may lock into and selectively amplify a regular cycle of pulsed electromagnetic radiation 220 responsively emitted from an object X. This selective amplification may facilitate detection by the electromagnetic radiation detector 210 of electromagnetic radiation frequencies responsively emitted from an object X, such as harmonics of the first and second source frequencies $\omega_1$ and $\omega_2$.

Where the electromagnetic radiation 215 includes electromagnetic radiation having a first source frequency $\omega_1$, then a power level of a second harmonic of the first source frequency $\omega_1$ in electromagnetic radiation 220 responsively emitted from an object X may be proportional to the square of a power level of the electromagnetic radiation 215, and a power level of a third harmonic of the first source frequency $\omega_1$ in electromagnetic radiation 220 responsively emitted from an object X may be proportional to the cube of the power level of the electromagnetic radiation 215. Thus, pulsed emissions of electromagnetic radiation 215 having a maximized power level may excite an object X to responsively emit electromagnetic radiation 220 that includes second, third, or second and third harmonics of a first source frequency $\omega_1$, with accordingly increased power levels. Such squared or cubed dependence of power levels of the second and third harmonics of the first source frequency $\omega_1$ in the electromagnetic radiation 220 on a power level of the electromagnetic radiation 215 may facilitate detection of these second and third harmonics by the electromagnetic radiation detector 210.

As a further example, the electromagnetic radiation source 205 may be configured to emit electromagnetic radiation 215 at a power level capable of degrading constituent materials of an object X and thereby compromising a configuration of the object X for suppressing responsive emission from the object X of electromagnetic radiation having a first source frequency $\omega_1$. For example, the electromagnetic radiation source 205 may be configured to emit electromagnetic radiation 215 at a power level capable of melting constituent materials of an object X, thereby damaging or destroying any capability of the object X for suppressing responsive emission from the object X of electromagnetic radiation. As another example, the electromagnetic radiation source 205 may be configured to so damage or destroy a nonlinear electromagnetic susceptibility of such an object X. Degradation or destruction of such a configuration or susceptibility of an object X may cause the object X to responsively emit reflected incoming electromagnetic radiation having a first source frequency $\omega_1$ or to responsively emit electromagnetic radiation at additional or different frequencies, which may facilitate detection of the presence or location of the object X by the electromagnetic radiation detector 210. For example, such degradation or destruction of such a configuration or susceptibility of an object X may cause the object X to responsively emit electromagnetic radiation at either or both of the first and second source frequencies $\omega_1$ and $\omega_2$ that may be included in the electromagnetic radiation 215. Where the electromagnetic radiation source 205 is configured to cause degradation or destruction of such a configuration or susceptibility of an object X, the system 200 may for example omit any filter 230 configured to attenuate electromagnetic radiation having either of the first and second source frequencies $\omega_1$ and $\omega_2$.

In an example, the electromagnetic radiation source 205 may be configured to emit electromagnetic radiation 215 having the first source frequency $\omega_1$ in a pulsed cycle, and the electromagnetic radiation detector 210 may be configured to determine that a presence of such an object X has been detected if the electromagnetic radiation detector 210 receives a responsive emission of electromagnetic radiation 220 including another frequency in the pulsed cycle. Further, the electromagnetic radiation source 205 may for example be configured to emit electromagnetic radiation 215 including a first source frequency $\omega_1$ in a pulsed cycle, and the system 200 may be configured to detect electromagnetic radiation 220 including a different frequency in the pulsed cycle that may be or may not be about a multiple of the first source frequency $\omega_1$, responsively emitted from an object X and received by the electromagnetic radiation detector 210. For example, the system 200 may include a lock-in amplifier 235. The lock-in amplifier 235 may have access to a signal indicating the pulsed cycle, as represented by a dotted line 245. The lock-in amplifier 235 may be configured to compare a phase of the cycle indicated in a signal communicated to the lock in amplifier 235 as represented by the dotted line 245, with a phase of electromagnetic radiation 220 received by the electromagnetic radiation detector 210. Electromagnetic radiation 220 having the same pulsed cycle as indicated in the signal represented by the dotted line 240 may then selectively be analyzed by the electromagnetic radiation detector 210. If, for example, the electromagnetic radiation 220 so analyzed has a frequency different than the first source frequency $\omega_1$ and that may be or may not be about a multiple of the first source frequency $\omega_1$, the system 200 may determine that a presence has been detected of an object X configured for suppressing responsive emission of electromagnetic radiation 220 having the first source frequency $\omega_1$. As another example, the electromagnetic radiation detector 210 may include a circuit 250 configured to selectively pass electromagnetic radiation having the pulsed cycle.

Figure 3:
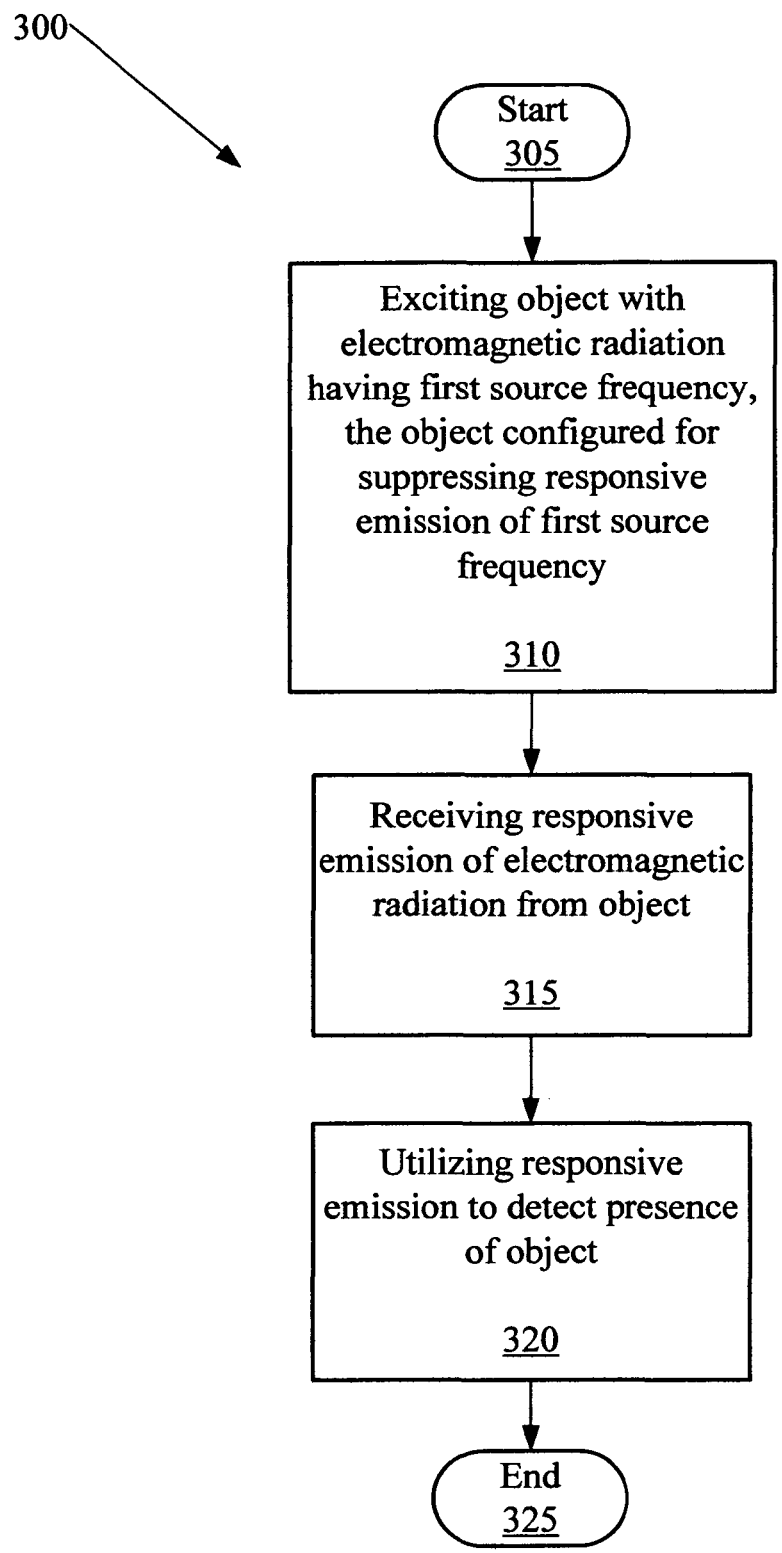
FIG. 3 is a flow chart showing an example of a method.

FIG. 3 is a flow chart showing an example of a method 300. The method 300 starts at step 305, and then step 310 includes exciting, with electromagnetic radiation 215 having a first source frequency $\omega_1$, an object X configured for suppressing responsive emission from such an object X of electromagnetic radiation 220 having the first source frequency $\omega_1$. Step 315 then includes receiving a responsive emission of electromagnetic radiation 220 from such an object X. The responsive emission is utilized at step 320 to detect a presence of such an object X. The method 300 may then end at step 325.

In an example, detecting the presence of such an object X at step 320 may include receiving a responsive emission of electromagnetic radiation 220 having a frequency generated by a nonlinear electromagnetic susceptibility of such an object X. As another example, detecting the presence of such an object X at step 320 may include determining a direction of a location of such an object X. For example, step 320 may include determining a direction of a location of such an object X relative to a location of the electromagnetic radiation detector 210. Step 320 may include determining a location of such an object X, as examples, based on an assessment of a direction from which a responsive emission of electromagnetic radiation 220 was received at step 315, or based on a determined time-of-flight delay or Doppler shift of responsive emissions of electromagnetic radiation 220 received at step 315.

As a further example, detecting the presence of such an object X at step 320 may include receiving a responsive emission of electromagnetic radiation 220 including a second or third harmonic of the first source frequency $\omega_1$. In another example, receiving a responsive emission of electromagnetic radiation 220 in step 315 may include attenuating electromagnetic radiation 220 having the first source frequency $\omega_1$. As a further example, receiving a responsive emission of electromagnetic radiation 220 in step 315 may include selectively passing a second or third harmonic of the first source frequency $\omega_1$.

Exciting such an object X at step 310 with electromagnetic radiation 215 having a first source frequency $\omega_1$ may, for example, include exciting such an object X with electromagnetic radiation 215 having a second source frequency $\omega_2$, and receiving a responsive emission at step 315 of electromagnetic radiation 220 from such an object X may include receiving a responsive emission of electromagnetic radiation 220 having a frequency that about includes a sum or a difference of the first and second source frequencies $\omega_1$ and $\omega_2$, or a multiple of one of the first and second source frequencies $\omega_1$ and $\omega_2$, or a combination of the foregoing. Further in that example, step 315 may include selectively passing electromagnetic radiation having a frequency that about includes a sum or a difference of the first and second source frequencies $\omega_1$ and $\omega_2$, or a multiple of one of the first and second source frequencies $\omega_1$ and $\omega_2$, or a combination of the foregoing. As an additional example, receiving a responsive emission of electromagnetic radiation 220 in step 315 may include detecting a second or third harmonic of either or both of the first source frequency $\omega_1$ and the second source frequency $\omega_2$. For example, step 315 may include filtering out electromagnetic radiation having a frequency other than a frequency that about includes a sum or a difference of the first and second source frequencies $\omega_1$ and $\omega_2$, or a multiple of one of the first and second source frequencies $\omega_1$ and $\omega_2$, or a combination of the foregoing. As another example, step 315 may include attenuating electromagnetic radiation having either or both of the first source frequency and the second source frequency $\omega_1$ and $\omega_2$.

Exciting such an object X at step 310 with electromagnetic radiation 215 may include exciting the object X with pulsed electromagnetic radiation 215 having the first source frequency $\omega_1$. Exciting such an object X at step 310 with electromagnetic radiation 215 may, as another example, include exciting such an object X with electromagnetic radiation 215 including the first source frequency $\omega_1$ in a pulsed cycle, and receiving a responsive emission of electromagnetic radiation 220 at step 315 from such an object X may include receiving a responsive emission of electromagnetic radiation 220 including another frequency in the pulsed cycle. Step 310 may further include selectively utilizing a responsive emission of electromagnetic radiation 220 in the pulsed cycle including the another frequency, to detect the presence of an object X.

As another example, exciting such an object X at step 310 with electromagnetic radiation 215 having a first source frequency $\omega_1$ may include exciting such an object X with electromagnetic radiation 215 having a power level capable of degrading constituent materials of such an object X. For example, degrading constituent materials of an object X in step 310 may include compromising a configuration of an object X for suppressing responsive emission from the object X of electromagnetic radiation having a first source frequency $\omega_1$. For example, the electromagnetic radiation 215 may melt constituent materials of an object X, thereby destroying any capability of the object X for suppressing responsive emission from the object X of electromagnetic radiation. As another example, degrading such a configuration may include degrading a nonlinear electromagnetic susceptibility of such an object X. Where step 310 includes causing degradation or destruction of such a configuration or susceptibility of an object X, receiving a responsive emission of electromagnetic radiation at step 315 may for example include receiving a responsive emission of electromagnetic radiation 220 including one or a plurality of source frequencies such as either of the first and second source frequencies $\omega_1$ and $\omega_2$.

The system 200 may, for example, be utilized for detecting an object X configured for suppressing responsive emission from the object X of electromagnetic radiation having a first source frequency $\omega_1$. Such objects may include, as an example, cloaking devices. A cloaking device may include a metamaterial. For example, an object X that is configured for suppressing responsive emission from the object X of electromagnetic radiation having a first source frequency $\omega_1$ may also have a nonlinear electromagnetic susceptibility. End-utilization examples for the system 200 may include, as examples, detection of enemy aircraft, ships, spacecraft, buildings, personnel, and other movable or stationary objects. Likewise, the method 300 may be utilized for detecting an object X configured for suppressing responsive emission from the object X of electromagnetic radiation having a first source frequency $\omega_1$. The method 300 may include taking advantage of a nonlinear electromagnetic susceptibility of a movable or stationary object X to facilitate its detection despite being configured for suppressing responsive emission from the object X of electromagnetic radiation having a first source frequency $\omega_1$. The method 300 may, for example, be implemented by operation of a system 200. However, while the foregoing description refers in some instances to the system 200, it is appreciated that the subject matter is not limited to these systems, nor to the systems discussed in the specification. Other system configurations may be implemented. Likewise, the method 300 may be performed utilizing any suitable system, of which the system 200 is an example. Further, it is understood by those skilled in the art that the method 300 may include additional steps and modifications of the indicated steps.

Moreover, it will be understood that the foregoing description of numerous examples has been presented for purposes of illustration and description. This description is not exhaustive and does not limit the claimed invention to the precise forms disclosed. Modifications and variations are possible in light of the above description or may be acquired from practicing the invention. The claims and their equivalents define the scope of the invention.

I claim:

1. A system, comprising:
    an electromagnetic radiation source configured to excite, with electromagnetic radiation having a first source frequency, an object configured to suppress the first source frequency in a responsive emission of electromagnetic radiation from such an object; and
    an electromagnetic radiation detector configured to receive a responsive emission of electromagnetic radiation from such an object, and configured to detect a presence of such an object upon determining a presence within the responsive emission of a second or third harmonic of the first source frequency.

2. The system of claim 1, wherein the system is configured to determine a direction of a location of such an object relative to a location of the electromagnetic radiation detector.

3. The system of claim 1, wherein the electromagnetic radiation detector includes a filter configured to attenuate electromagnetic radiation having the first source frequency.

4. The system of claim 1, wherein the electromagnetic radiation detector includes a filter configured to selectively pass a second or third harmonic of the first source frequency.

5. The system of claim 1, wherein the electromagnetic radiation source is configured to emit electromagnetic radiation having the first source frequency in a pulsed cycle, and wherein the electromagnetic radiation detector is configured to determine that a presence of such an object has been detected if the electromagnetic radiation detector determines a presence within the responsive emission of another frequency in the pulsed cycle.

6. The system of claim 1, wherein the electromagnetic radiation source is configured to emit electromagnetic radiation having a power level capable of degrading constituent materials of such an object.

7. A system, comprising:
an electromagnetic radiation source configured to excite, with electromagnetic radiation having first and second source frequencies, an object configured to suppress the first and second source frequencies in a responsive emission of electromagnetic radiation from such an object; and
an electromagnetic radiation detector configured to receive a responsive emission of electromagnetic radiation from such an object, and configured to detect a presence of such an object upon determining a presence within the responsive emission of about a frequency that includes a sum or a difference of the first and second source frequencies, or a multiple of one of the first and second source frequencies, or a combination of the foregoing.

8. The system of claim 7, wherein the electromagnetic radiation detector is configured to detect a second or third harmonic of either or both of the first source frequency and the second source frequency.

9. The system of claim 7, wherein the electromagnetic radiation detector includes a filter configured to attenuate electromagnetic radiation having either or both of the first source frequency and the second source frequency.

10. The system of claim 7, wherein the electromagnetic radiation detector includes a filter configured to selectively pass a frequency about including a sum or a difference of the first and second source frequencies, or a multiple of one of the first and second source frequencies, or a combination of the foregoing.

11. The system of claim 7, wherein the system is configured to determine a direction of a location of such an object relative to a location of the electromagnetic radiation detector.

12. The system of claim 7, wherein the electromagnetic radiation source is configured to emit electromagnetic radiation having the first and second source frequencies in pulsed cycles, and wherein the electromagnetic radiation detector is configured to determine that a presence of such an object has been detected if the electromagnetic radiation detector determines a presence within the responsive emission of another frequency in the pulsed cycle.

13. The system of claim 7, wherein the electromagnetic radiation source is configured to emit electromagnetic radiation having a power level capable of degrading constituent materials of such an object.

14. A method, comprising:
exciting, with electromagnetic radiation having a first source frequency, an object configured to suppress the first source frequency in a responsive emission of electromagnetic radiation from such an object;
receiving a responsive emission of electromagnetic radiation from such an object; and
detecting a presence of such an object upon determining a presence within the responsive emission of a second or third harmonic of the first source frequency.

15. The method of claim 14, wherein detecting the presence of such an object includes determining a direction of a location of such an object relative to a location of the electromagnetic radiation detector.

16. The method of claim 14, wherein detecting the presence of such an object includes determining a presence within the responsive emission of a second or third harmonic of the first source frequency.

17. The method of claim 14, wherein exciting such an object with electromagnetic radiation includes exciting such an object with electromagnetic radiation having the first source frequency in a pulsed cycle, and wherein determining that a presence of such an object has been detected includes determining a presence within the a responsive emission of another frequency in the pulsed cycle.

18. The method of claim 14, wherein exciting such an object with electromagnetic radiation having a first source frequency includes exciting such an object with electromagnetic radiation having a power level capable of degrading constituent materials of such an. object.

19. A method, comprising: exciting, with electromagnetic radiation having first and second source frequencies, an object configured to suppress the first and second source frequencies in a responsive emission of electromagnetic radiation from such an object; receiving a responsive emission of electromagnetic radiation from such an object; and detecting a presence of such an object upon determining a presence within the responsive emission of a frequency that about includes a sum or a difference of the first and second source frequencies, or a multiple of one of the first and second source frequencies, or a combination of the foregoing.

20. The method of claim 19, wherein detecting the presence of such an object includes determining a direction of a location of such an object relative to a location of the electromagnetic radiation detector.

21. The method of claim 19, wherein exciting such an object with electromagnetic radiation includes exciting such an object with electromagnetic radiation having the first and second source frequencies in pulsed cycles, and wherein determining that a presence of such an object has been detected includes determining a presence within the responsive emission of another frequency in the pulsed cycle.

22. The method of claim 19, wherein exciting such an object with electromagnetic radiation having the first and second source frequencies includes exciting such an object with electromagnetic radiation having a power level capable of degrading constituent materials of such an object.

* * * * *